Figure 1:
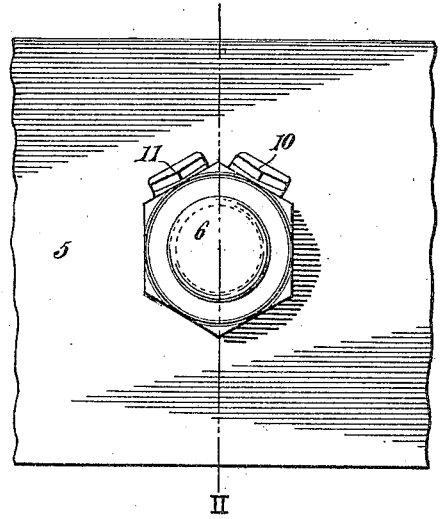

G. R. HOLMES AND W. J. WISCH.
NUT LOCK.
APPLICATION FILED JAN. 26, 1921.

1,397,252.

Patented Nov. 15, 1921.

Inventors
G. R. Holmes
W. J. Wisch

By J. T. Dawling.
Attorney

UNITED STATES PATENT OFFICE.

GWYLLYM R. HOLMES AND WALTER J. WISCH, OF BALTIMORE, MARYLAND.

NUT-LOCK.

1,397,252.  Specification of Letters Patent.  Patented Nov. 15, 1921.

Application filed January 26, 1921. Serial No. 439,989.

*To all whom it may concern:*

Be it known that I, GWYLLYM R. HOLMES and WALTER J. WISCH, citizens of the United States, residing at Baltimore, in the city of Baltimore and State of Maryland, have invented certain new and useful Improvements in Nut-Locks, of which the following is a specification.

This invention relates to certain new and useful improvements in nut locks and has particular reference to an improved form of washer adapted for reception upon a bolt and constructed so as to effectively prevent retrograde turning of a nut threaded upon said bolt.

The present invention is specifically designed as an improvement on the type of washer shown, described and claimed in the patent to Harry G. Norwood, No. 1,319,894, dated October 28, 1919, of which we are parties in interest, and that shown in our U. S. application, Serial No. 379,795, filed May 8th, 1920.

In nut locks of the above kind, although a quite effective locking of the nut is obtained, it has been found that the efficiency of the locking is impaired to a noticeable extent due to the inability to practically construct the elements so as to obtain an intimate flat contact between the nut, washer and work, when the washer is comparatively rigid or inflexible.

The primary object of the present invention is, therefore, to provide improved means for readily and more effectively locking nuts against turning, said means being so constructed as to render unnecessary any modification of the nut or bolt such as the provision of grooves or the like, and permitting the nut to be tightly turned home on the bolt with extremely intimate contact set up between the nut, washer and work.

It is desirable that the washer be stamped from sheet material of such thickness to insure necessary strength, that the washer will not flex or yield for obtaining this intimate contact when the washer is endless or unbroken.

We preferably accomplish the above object by making the washer of split form and relatively laterally flexing the end portions of the same so that said end portions of the washer are normally in different planes, the washer being resilient so as to permit the necessary relative yielding of the end portions as the nut is turned home, thus obtaining an increasing surface contact and friction between the nut, washer and work as the nut is turned home, and permitting ultimate intimate contact of these parts substantially throughout their adjacent surfaces.

With the above general object in view and others that will become apparent as the nature of the invention is better understood, the same consists in the novel form, combination and arrangement of parts hereinafter more fully described, shown in the accompanying drawing and claimed.

Figure 2:
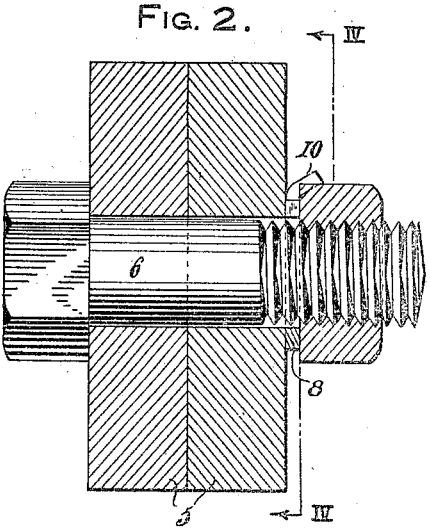
Figure 3:
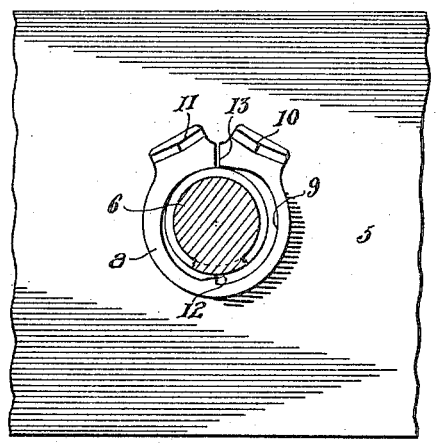
Figure 4:
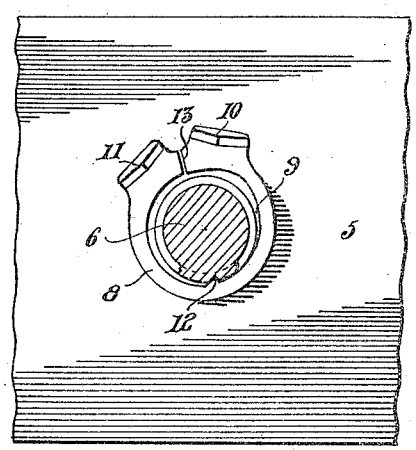
Figure 5:
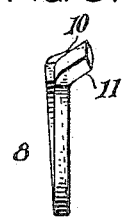

In the drawing wherein like characters of reference indicate corresponding parts throughout the several views, Figure 1 is an end elevational view of a bolt having a nut and our improved washer operatively disposed thereon and illustrated in connection with the work or the members being bolted together, Fig. 2 is a sectional view taken substantially upon line II—II of Fig. 1, Figs. 3 and 4 are views taken substantially upon line IV—IV of Fig. 2, the washer being in its initial or ineffective position in Fig. 3 and in its locking position in Fig. 4, and Fig. 5 is an edge elevational view of the locking washer removed.

Referring to the drawing in detail, 5 indicates a pair of members which are bolted together by means of the bolt 6 and nut 7, said nut being threaded upon the screw threaded end of the bolt 6 after our improved locking washer 8 has been placed thereon as shown in Fig. 3.

The locking washer 8 preferably comprises a thin body of metal having a central substantially oval aperture 9 whose major diameter is slightly larger than the diameter of the shank of the bolt 6, and whose smallest diameter is substantially equal to the diameter of the bolt 6, so that said washer 8 may be readily slid onto the threaded end of the bolt to engage the adjacent side face of the adjacent bolted member 5. Extending laterally at an obtuse angle to the body of the washer 8 are a pair of spaced rigid tongues 10 whose inner faces are convexed as at 11. As shown clearly in Figs. 3 and 4, the washer 8 is provided with an inwardly projecting spur 12 which is tangentially projected inwardly from one end of the aperture 9 for a purpose which will presently become apparent.

The washer is split as at 13, preferably between the tongues 10, and the end portions thus produced are relatively laterally flexed so that said end portions are normally in different planes as shown in Fig. 5.

In the use of the present invention, the bolt 6 is inserted through the members 5 and the washer 8 is slid onto the end of the bolt 6 into the position shown in Fig. 3, whereupon the nut 7 is threaded upon the bolt 6 until the inner end of one corner of the nut engages an inclined face of one of the tongues 10 as shown in Fig. 1, the inner face of said tongue 10 being convexed so as to prevent the corner of the nut from engaging the tongue until the same has passed to a point substantially midway between the side edges of the tongue, thereby insuring a firm and effective engagement of the nut with the tongue. This can be appreciated by reference to Fig. 1 of the above mentioned patent wherein the inner faces of the tongues are perfectly flat. Further rotation of the nut 7 carries the washer 8 around slightly and simultaneously causes said washer to slide laterally or transversely of the bolt to the position of Fig. 4 wherein said washer is effectively prevented from rotation by penetration of the spur 12 in the threads of the bolt 6. Obviously, as the nut is screwed home firmly, the spur 12 is firmly embedded in the bolt and the nut is prevented from turning backwardly by engagement of the tongues 10 with the side faces of the nut.

As the washer is resilient, the end portions thereof flex toward each other when the nut is turned home, thus accommodating the nut and work and giving a gradually increasing surface contact and great friction between the nut, washer and work and permitting ultimate intimate contact of these parts substantially throughout their adjacent surfaces.

In practice, the present washer has been found to more effectively prevent rotation of nuts than prior similar devices, when the nuts are subjected to extremely severe vibration, and the present invention is extremely practical because of the fact that no costly modification of standard bolts and nuts is necessary to its use and operation. It will of course be understood that the bolt 6 is prevented from turning in any suitable manner while screwing the nut 7 home upon the same.

It is believed that the construction and operation of the present invention as well as the advantages thereof will be readily understood by those skilled in the art, and while the form of the invention herein shown and described is what is believed to be the preferable embodiment thereof, it is nevertheless to be understood that minor changes may be made without departing from the spirit and scope of the invention as claimed.

What is claimed as new is:—

1. In combination with a member having a bolt extending therethrough and a nut threaded thereon, a washer loosely arranged upon the bolt between the member and the nut and having a rigid tongue engageable by the nut to prevent turning of the latter and to cause movement of the washer when the nut is threaded onto the bolt, said washer being laterally resilient and flexible and being provided with an inwardly projecting rib arranged to dig into the threads of the bolt when the washer is moved.

2. In combination with a member having a bolt extending therethrough and a nut threaded thereon, a laterally resilient flexible washer loosely arranged upon the bolt for movement thereon in a transverse direction, a spur projecting inwardly from said washer, and means on said washer engageable by the nut to prevent turning of the latter and to cause transverse movement of the washer whereby said spur is caused to penetrate the threads of said bolt.

3. In combination with a member having a bolt extending therethrough and a nut threaded thereon, a laterally resilient flexible washer loosely arranged upon the bolt for movement thereon in a transverse direction, a spur projecting inwardly from said washer, and means on said washer engageable by the nut to prevent turning of the latter and to cause transverse movement of the washer whereby said spur is caused to penetrate the threads of said bolt, said washer being split and having its end portions relatively laterally flexed normally in different planes.

4. In combination with a member having a bolt extending therethrough and a nut threaded thereon, a laterally resilient flexible washer loosely arranged upon the bolt for movement thereon in a transverse direction, a spur projecting inwardly from said washer, and means on said washer engageable by the nut to prevent turning of the latter and to cause transverse movement of the washer whereby said spur is caused to penetrate the threads of said bolt, said last named means including a pair of spaced rigid tongues projecting at an obtuse angle from the body of the washer for engagement with the sides of the nut, said washer being split between said tongues and having its end portions relatively laterally flexed normally in different planes.

In testimony whereof we hereunto affix our signatures.

GWYLLYM R. HOLMES.
WALTER J. WISCH.